Figure 9:
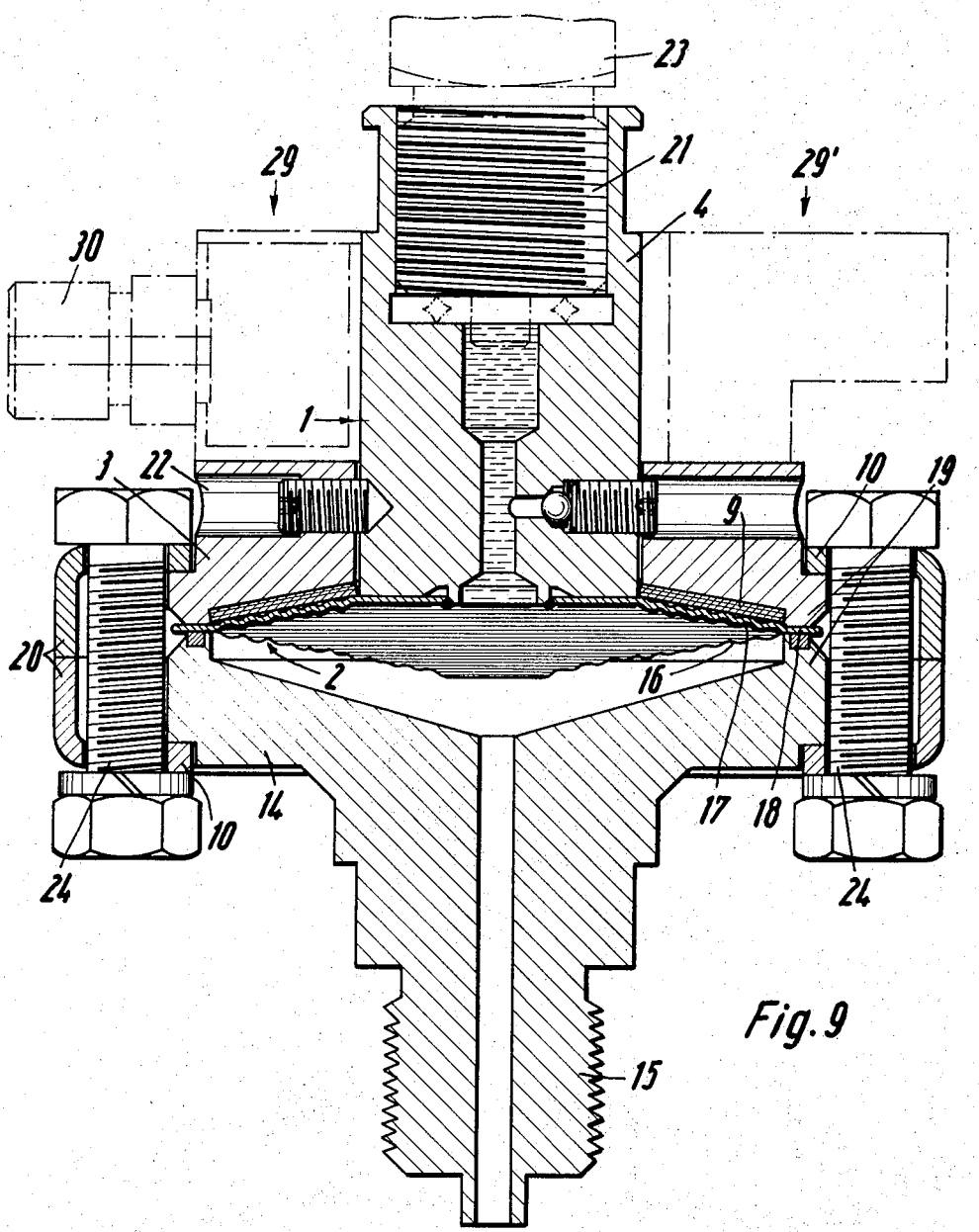

United States Patent [19]
Neugebauer

[11] 3,808,890
[45] May 7, 1974

[54] PRESSURE TRANSMITTING DEVICE

[75] Inventor: Gerhard Neugebauer, Trennfurth, Germany

[73] Assignee: Alexander Wiegand Armaturen- und Manometerfabrik, Main, Germany

[22] Filed: Oct. 12, 1972

[21] Appl. No.: 296,830

[30] Foreign Application Priority Data
Oct. 14, 1971 Germany............................ 2151226
Sept. 9, 1972 Germany............................ 2244292

[52] U.S. Cl......................... 73/406, 73/393, 73/395
[51] Int. Cl. .............................................. G01l 7/08
[58] Field of Search ............ 73/395, 392, 393, 116, 73/119 R, 406, 407, 398 AR

[56] References Cited
UNITED STATES PATENTS
2,568,238  9/1951  Le Van................................ 73/395
2,458,086  1/1949  MacMillan............................ 73/406
2,940,313  6/1960  Li.................................. 73/398 AR
3,371,537  3/1968  Kiene................................ 73/395

*Primary Examiner*—Donald O. Woodiel
*Attorney, Agent, or Firm*—Leonard H. King

[57] ABSTRACT

A pressure transmitting device is disclosed having a member which defines a passage for the transmission of fluid pressure and a diaphragm associated with the passage defining member. There is also provided an annular securing member for securing said passage-defining member directly or indirectly to an apparatus containing fluid whose pressure is to be measured in such manner that the pressure of said fluid is applied to said diaphragm. The diaphragm is sealingly secured directly to the passage-defining member, and the securing member is detachably engageable over the said passage-defining member to secure the latter to fluid-containing apparatus.

10 Claims, 12 Drawing Figures

PATENTED MAY 7 1974 3,808,890
SHEET 1 OF 3
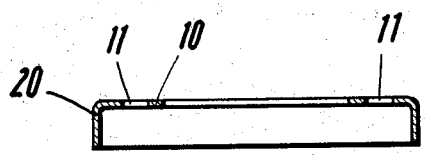
Fig. 1
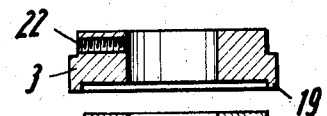
Fig. 2
Fig. 3
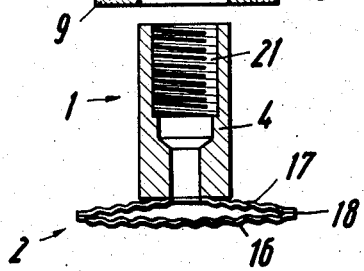
Fig. 4
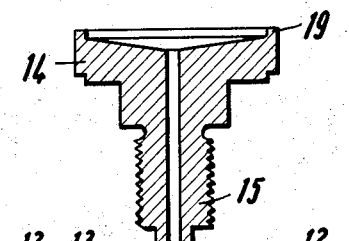
Fig. 5
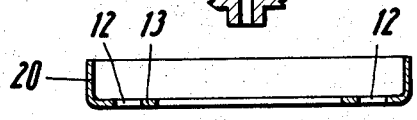
Fig. 6
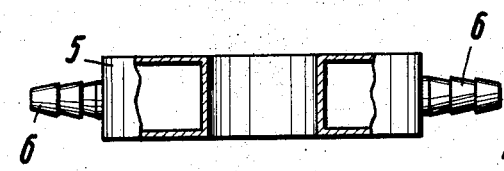
Fig. 7
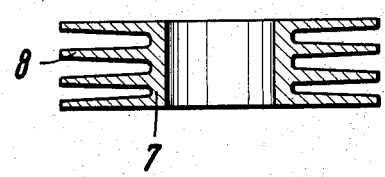
Fig. 8

PRESSURE TRANSMITTING DEVICE

This invention relates to a pressure transmitting device. In the known devices of this kind a diaphragm whose purpose is to separate a fluid whose pressure is to be measured from a pressure measuring apparatus is clamped between two annular members which are held together by two outer clamping rings.

Such pressure transmitting devices are for example known according to German Pat. Nos. 1,300,706 and DAS 2,013,647. Some pressure measurements require that the fluid whose pressure is to be measured is separated from the measuring apparatus, i.e., an intermediate member in the form of a diaphragm or diaphragm capsule is inserted between the fluid medium whose pressure is to be measured and the fluid in the measuring system of the pressure measuring apparatus, so that the first-mentioned fluid only extends as far as the diaphragm and does not even reach the interior of the measuring apparatus. This expedient is necessary in the case of pressure measurement of for example highly corrosive, high radiation or high temperature fluid. If for example in the case of a high temperature fluid this were to pass directly into the measuring system of the pressure measuring apparatus, or were to be kept therein, then measuring errors would be unavoidable. The pressure transmitting devices of the type indicated carry out this task quite satisfactorily, but their design is unsatisfactory in that material and manufacturing costs in the production thereof are relatively high thus making the devices expensive. In addition such devices can only be cooled by involving a relatively high expenditure as in the case with the device according to the said DAS Pat. Nos. 1,013,647. In addition the devices known from said publications require special disconnectable seals between the member provided with the threaded connection for the pressure measuring apparatus and a threaded member associated with the pressure transmitting diaphragm.

It is therefore the object of the present invention to obviate or at least reduce these disadvantages, i.e., a pressure transmitting device is to be provided whose material and manufacturing costs are lower hence making it less costly to produce, which requires no special seal as mentioned above, and which has simple extension possibilities for the addition of cooling members.

According to the invention there is provided a pressure transmitting device including a passage-defining member which is adapted to mount a pressure measuring apparatus and which defines a passage for the transmission of fluid pressure to said measuring apparatus from a pressure-sensitive diaphragm associated with said passage-defining member, and an annular securing member for securing said passage-defining member directly or indirectly to an apparatus containing fluid whose pressure is to be measured in such a manner that the pressure of said fluid is applied to said diaphragm, the said diaphragm being sealingly secured directly to the said passage-defining member, and the said securing member being detachably engageable over the said passage-defining member to secure the latter to said fluid-containing apparatus.

As a result of this construction advantageously no seal is required between the diaphragm and the threaded connection for the measuring apparatus. By connecting the said passage-defining member directly by soldering or welding with the rigid upper portion of a diaphragm capsule, the said passage-defining member can be cut to length from standard bar stock and can be worked without any large material wastage. With a view to reducing the cost of materials it is generally possible to use for the said member stainless material. If the said member is made long enough a simple attachment possibility for a cooling member is provided without any special constructional measures being necessary in the device because on the extended passage-defining member it is possible without difficulties to provide a cooling member in the form of a slip-on annular casing with connections for the through-flow of a cooling medium or in the form of a slip-on ring with axially or radially directed cooling vanes. Advantageously, for the purpose of thermal installation, a circular disc of thermally insulating material can be inserted between such a casing and the top of the said passage-defining member.

The rigid upper portion of the diaphragm capsule naturally has an opening where it is connected to the said passage-defining member, for communication with the interior of the measuring apparatus e.g. with the interior of a Bourdon spring.

Preferably the device includes a second passage-defining member which is adapted to be secured directly to said fluid-containing apparatus and is clampable to the first-mentioned passage-defining member by first and second clamping members engageable with said annular securing member and said second passage-defining member respectively, so that said passage-defining members together define a passage across which said diaphragm extends.

Figure 10:
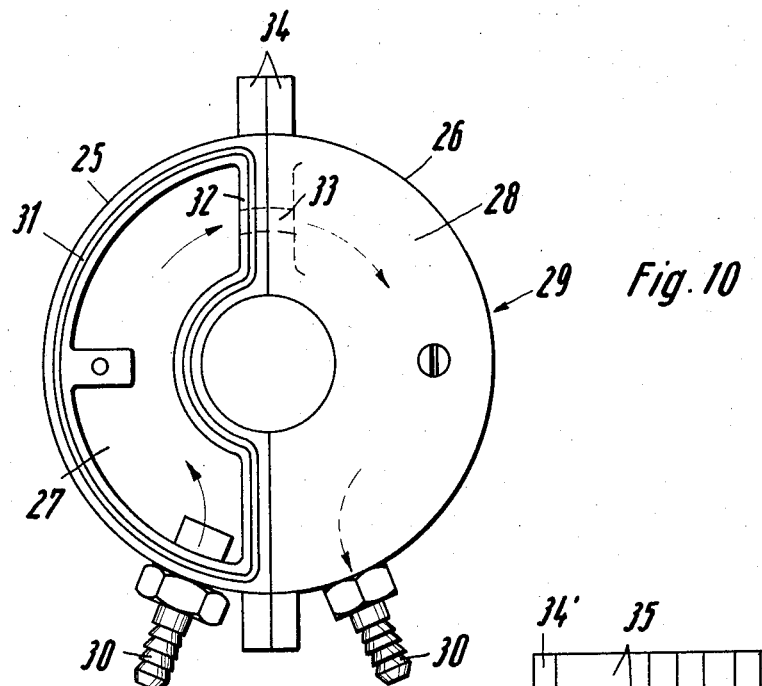
Figure 12:
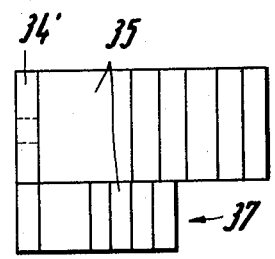
Figure 11:
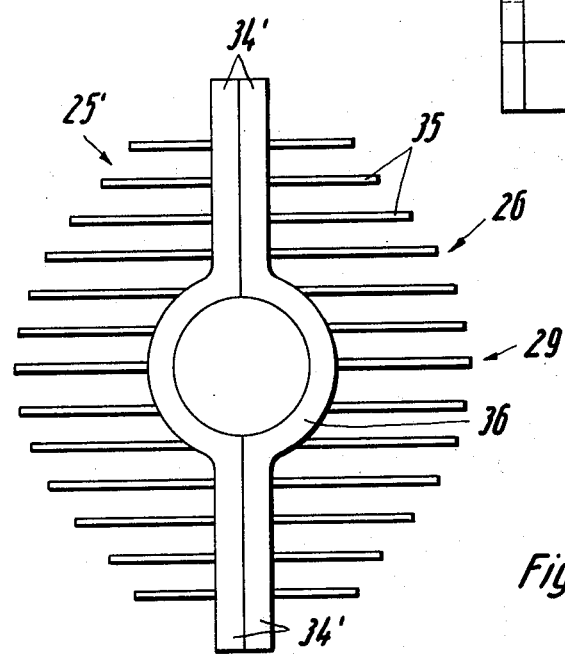

One example of a device according to the invention is subsequently explained with reference to the accompanying drawings, in which are shown in cross-section:

FIG. 1 an upper clamping ring,
FIG. 2 an annular securing member,
FIG. 3 a thermally insulating annular disc,
FIG. 4 a first passage-defining member carrying a diaphragm capsule,
FIG. 5 a second passage-defining member,
FIG. 6 a lower clamping ring,
FIG. 7 a cooling member in the form of an annular casing,
FIG. 8 a cooling member in form of a slip on ring, with cooling vanes,
FIG. 9 a section through the assembled pressurise transmitting device,
FIG. 10 in plan view one closed and one opened half of a cooling member for the passage of liquid,
FIG. 11 in plan a cooling member provided with vanes,
FIG. 12 a side view of half the cooling member according to FIG. 11.

Except for FIGS. 7 and 8 the components of FIGS. 1 to 6 are shown in the sequence in which they are assembled according to FIG. 9.

In the drawings 1 is the passage-defining member for mounting a pressure measuring apparatus, 2 the diaphragm capsule, 3 the annular securing member, 4 the extended tube of the member 1, 5 a cooling member in the form of an annular casing, 6 the connections for cooling medium, 7 a cooling member in the form of a slip-on ring provided with cooling ribs 8, and 9 is an annular disc made from thermally insulating material. 10 is an upper clamping ring provided with holes 11, 13 a lower clamping ring provided with holes 12, 14 a lower passage-defining member provided with a threaded connection 15, 16 is a movable diaphragm of capsule 2, and 17 is the rigid upper portion of the capsule rigidly fixedly connected with tube 4. During assembly all the components of FIGS. 1 to 6 are assembled in the sequence shown and held tightly together by screws 24 which are introduced through the holes 11 and 12 of clamping rings 10 and 13 so that the capsule edge 18 is clamped tightly between edges 19 of annular members 3 and 14. The peripheral margins 20 of the clamping rings must naturally be so dimensioned that an adequately tight clamping action is ensured for capsule edge 18.

After this assembly of the components the cylindrical tube 4 of member 1 projects from annular securing member 3 and the upper clamping ring 10 so that depending on the type of cooling required the cooling member according to FIGS. 7 or 8 can be loosely pushed on. The pressure measuring apparatus 23 is then screwed into the internal thread 21 of member 1 whilst threaded connection 15 is connected to the apparatus containing fluid whose pressure is to be measured.

It is also possible to make a direct connection, e.g. to a fluid container, without members 14 and 20, wherein then the upper clamping ring (optionally with an appropriately adapted cross-sectional shape) is screwed directly against a container or tube flange. It is important that the components of FIGS. 2 to 4 remain the same. It is advantageous for the upper annular securing member 3 to be provided with at least 1 transverse bore 22 so that said annular flange can be firmly but detachably connected to the tube 4 of the member 1. The radially extending ribs 8 in FIG. 8 can naturally also extend axially.

The pressure transmitting device with cooling members can also advantageously be so further developed that the cooling members if necessary can at any time subsequently be fitted to the pressure measuring apparatus or to the passage-defining member without any components having to be disassembled. The association of cooling members is shown schematically and by dotted lines in FIG. 9 wherein for reasons of simplicity, at top left hand side one half of a water cooled cooling member is shown and in the upper right hand side half of an air cooled cooling member. In the actual construction naturally either only a water cooled or only an air cooled member is provided.

In the case of cooling member 29 according to FIG. 10 the two halves are shown at 25 and 26 on each of which is mounted a fluid connection 30. The inner chambers 27 of halves 25 and 26 are accessible by loosening screwed-on cover halves 28 which on screwing up are pressed against a sealing strip 31. The two inner chambers 3 have opposite the region of the connections 30 their front walls 32 a bore 33 so that the flow through cooling member 29 is in the direction of the arrows. In consideration of bore 33 a sealing medium is provided between the two halves 25, 26. After arranging the two halves 25, 26 on tube 4 of the pressure gauge connection 1 (FIG. 9) these are held together by means of their flange 34 and by appropriate screws.

Cooling member 29' according to FIG. 11 which is only provided with cooling ribs 35 also comprises two halves 25', 26' each of which comprises a semi-circular wall 36 and flanges 34' connected therewith which serve as supports for ribs 35.

Advantageously the halves 25', 26' are stepped as shown in FIG. 12, whereby the complete length of the tube of the pressure gauge connection can be utilized, i.e., through the lower stepped part 37 of ribs 35 the heads of screws 34 of clamping rings 10 (FIG. 9) are more readily accessible.

What I claim is:

1. A pressure transmitting device of the type adapted to be used with a cooling member, said pressure transmitting device comprising:
   a. a first annular member having means for receiving a pressure measuring device, said first annular member including an axially extending, cylindrical connection fitting, including an exterior mounting surface for mounting a cooling member around a portion of said connection fitting, said fitting having a first passage way therethrough said mounting surface surrounding at least a portion of said passage way,
   b. a second annular member having a second passage way therethrough that is adapted to be placed in communication with a fluid pressure to be measured;
   c. diaphragm means sealingly secured between said first and second annular members for preventing fluid communication between said first and said second passage ways; and
   d. means for releasibly clamping said first and said second annular members to each other.

2. The device according to claim 1 wherein a cooling member is further included.

3. The pressure transmitting device according to claim 2 wherein said cooling member is in the form of an annular, slip-on casing having connections therein for the passage of a cooling medium.

4. The device according to claim 2 wherein said cooling member is in the form of a slip-on ring having axially extending cooling vanes.

5. The device according to claim 2 wherein said cooling member is in the form of a slip-on ring having radially extending cooling vanes.

6. The device according to claim 2 wherein said cooling member comprises two half sections each having flange portions and means for clamping said flange portions together.

7. The device according to claim 6 wherein said two half sections are hollow and wherein there is further included a detachable cover for permitting access to the interior of said hollow half sections.

8. The device according to claim 6 wherein said two half sections are each provided with cooling vanes.

9. The device according to claim 8 wherein said vanes are provided with a stepped region.

10. The device according to claim 1 wherein there is further provided an annular disc of thermally insulating material positioned between said first annular member and said diaphragm.

* * * * *